US009770799B2

(12) United States Patent
Guy

(10) Patent No.: US 9,770,799 B2
(45) Date of Patent: Sep. 26, 2017

(54) ROTATING CHUCK WITH COOLANT GROOVE ARRANGEMENT

(71) Applicant: Iscar, Ltd., Tefen (IL)

(72) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 43 days.

(21) Appl. No.: 14/614,958

(22) Filed: Feb. 5, 2015

(65) Prior Publication Data
US 2016/0229017 A1    Aug. 11, 2016

(51) Int. Cl.
*B23B 31/02* (2006.01)
*B23Q 11/10* (2006.01)
*B23B 31/117* (2006.01)

(52) U.S. Cl.
CPC .......... *B23Q 11/1023* (2013.01); *B23B 31/02* (2013.01); *B23B 31/028* (2013.01); *B23B 31/117* (2013.01); *B23B 2231/24* (2013.01); *B23B 2250/12* (2013.01); *Y10T 279/17111* (2015.01)

(58) Field of Classification Search
CPC . B23B 31/02; B23B 2231/24; B23B 2250/12; B23Q 11/1023; Y10T 279/17111
See application file for complete search history.

(56) References Cited

U.S. PATENT DOCUMENTS

| 4,640,652 | A | * | 2/1987 | Rivera, Jr. | ........... | B23Q 1/0036 |
| | | | | | | 279/20 |
| 5,311,654 | A | * | 5/1994 | Cook | ...................... | B23B 31/00 |
| | | | | | | 279/103 |
| 5,358,360 | A | | 10/1994 | Mai | | |
| 6,059,296 | A | * | 5/2000 | Baeder | ................ | B23B 31/1071 |
| | | | | | | 279/20 |
| 6,595,528 | B2 | * | 7/2003 | Voss | ........................ | B23B 31/02 |
| | | | | | | 279/102 |
| 7,357,607 | B2 | * | 4/2008 | Vlismas | .............. | B23B 31/1075 |
| | | | | | | 279/20 |
| 9,022,393 | B2 | * | 5/2015 | Guy | ........................ | B23B 31/02 |
| | | | | | | 279/20 |
| 2004/0164501 | A1 | * | 8/2004 | Gotzfried | ............... | B23Q 11/10 |
| | | | | | | 279/20 |
| 2010/0270757 | A1 | | 10/2010 | Beckington | | |

(Continued)

FOREIGN PATENT DOCUMENTS

| DE | 4322552 | A1 | * | 1/1995 | ............. B23B 31/02 |
| DE | 4322552 | A1 | | 1/1995 | |
| DE | 19654010 | A1 | * | 7/1998 | ......... B23B 31/1076 |

(Continued)

OTHER PUBLICATIONS

International Search Report dated May 24, 2016, issued in PCT counterpart application (No. PCT/IL2016/050106.

(Continued)

Primary Examiner — Eric A Gates
(74) Attorney, Agent, or Firm — Womble Carlyle

(57) ABSTRACT

A rotating chuck includes a coolant groove arrangement integrally along a shank-receiving bore of the rotating chuck. The groove arrangement defines a flow path in fluid communication with front and rear bore ends. The groove arrangement includes one or more slanted groove portions opening out to, and being inwardly inclined towards, a front chuck end of the rotating chuck.

20 Claims, 3 Drawing Sheets

(56) References Cited

U.S. PATENT DOCUMENTS

2011/0156363 A1    6/2011  Haimer
2013/0069322 A1*  3/2013  Nakai .................. B23B 31/028
                                                                                     279/20

FOREIGN PATENT DOCUMENTS

| DE | 19654010 A1 | 7/1998 | |
|----|----|----|----|
| DE | 202006014556 U1 | 2/2007 | |
| DE | 202011004231 U1 | 8/2011 | |
| EP | 1074322 A1 * | 2/2001 | ......... B23B 31/1179 |
| EP | 1074322 | 7/2001 | |
| JP | 08090318 A * | 4/1996 | |
| JP | 2000015539 A * | 1/2000 | |

OTHER PUBLICATIONS

Written Opinion dated May 24, 2016, issued in PCT counterpart application (No. PCT/IL2016/050106).

* cited by examiner

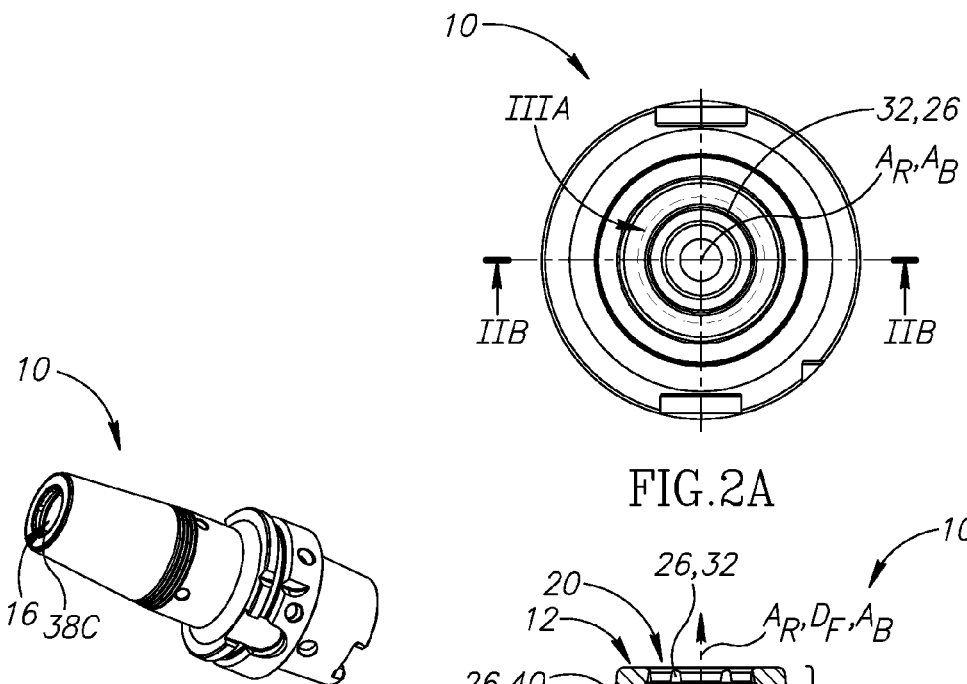
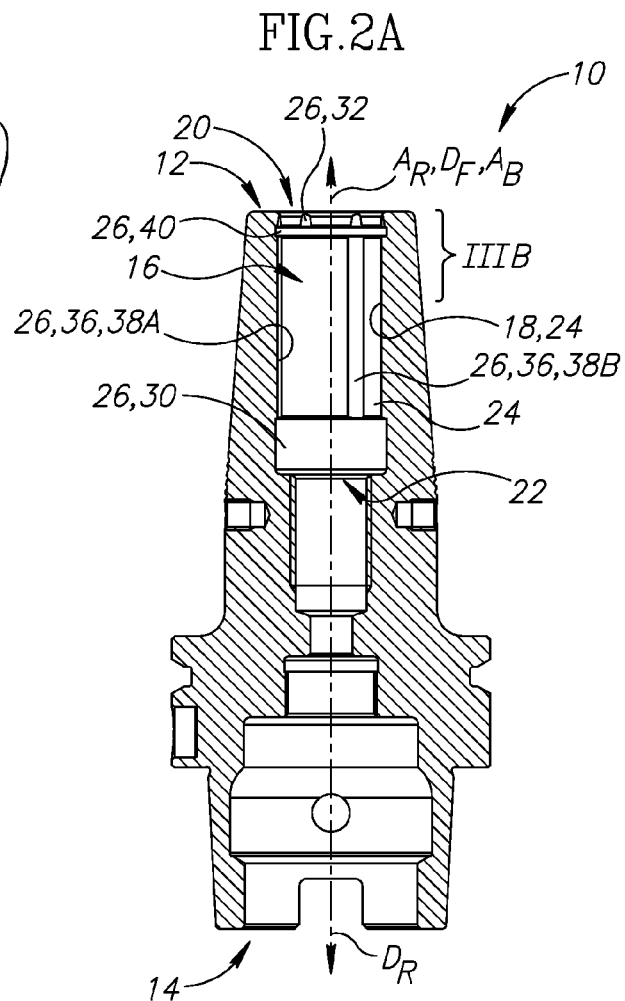
FIG.1
FIG.2A
FIG.2B

US 9,770,799 B2

ROTATING CHUCK WITH COOLANT GROOVE ARRANGEMENT

FIELD OF THE INVENTION

The subject matter of the present application relates to rotating chucks comprising a groove arrangement integrally formed along a shank-receiving bore configured for receiving and holding a shank of a tool. More particularly, a flow path through the shank-receiving bore and exiting the rotating chuck is defined only by a tool's shaft and the groove arrangement formed on the shank-receiving bore.

BACKGROUND OF THE INVENTION

US 2011/0156363 discloses chucks with coolant groove arrangements. In some embodiments there is a coolant flow path through a shank-receiving bore which is defined only by the tool's shaft and the groove arrangement.

U.S. Pat. No. 5,358,360 discloses a chuck with coolant grooves. However the coolant flow path includes, in addition to a tool and a groove arrangement (FIG. 3), an extra component in the form of a detachable nozzle ring which is fixedly tightened on the front end portion of the chuck (col. 2, first full paragraph). The detachability of the nozzle ring or the nozzles is stated to allow a user to advantageously selectively direct coolant flow for a wide variety of tools (final paragraph of the background and col. 2, fifth full paragraph).

SUMMARY OF THE INVENTION

According to a first aspect of the subject matter of the present application, there is provided a rotating chuck comprising a groove arrangement integrally formed along a shank-receiving bore of the chuck. The groove arrangement defines a flow path which is in fluid communication with front and rear bore ends of the shank-receiving bore. The groove arrangement comprises one or more slanted groove portions opening out to, and being inwardly inclined towards, a front chuck end of the chuck.

It will be understood that, unlike U.S. Pat. No. 5,358,360 which discloses a flow path at least partially defined with a detachable nozzle ring, rotating chucks according to the subject matter of the present application define a flow path through a groove arrangement which is integrally formed along a shank-receiving bore. Stated differently, all portions of the groove arrangement are formed on a portion of the rotating chuck having a unitary one-piece construction.

According to another aspect of the subject matter of the present application, there is provided a rotating chuck comprising:
a front chuck end; and
a shank-receiving bore opening out to, and extending rearwardly from, the front chuck end;
the shank-receiving bore defined by a circumferentially extending bore surface and:
having a bore axis extending through the center of the shank-receiving bore and defining forward and rearward directions; and
comprising a front bore end proximate to the front chuck end of the chuck and a rear bore end rearward of the front bore end;
the bore surface comprising:
one or more shank abutment sub-surfaces defining a bore diameter; and
a groove arrangement recessed in the shank-receiving bore further than the one or more shank abutment sub-surfaces from the central bore axis;
the groove arrangement defining a flow path in fluid communication with the front and rear bore ends and comprising:
an annular inlet groove at the rear bore end;
one or more slanted groove portions opening out to, and being inwardly inclined towards, the front chuck end; and
one or more intermediary grooves connecting the annular inlet groove and the one or more slanted groove portions; wherein
the shank-receiving bore, including the groove arrangement, is formed on a portion of the rotating chuck having one-piece unitary construction.

It will be understood that a groove arrangement according to the subject matter of the present application can be advantageous, for example such arrangement can facilitate:
an appropriately directed coolant flow which on the one hand is sufficiently inwardly directed to counter outward centrifugal forces and on the other hand exits the rotational chuck from a position close enough to a center of the shank-receiving bore such that the slanted angle required is not so great as to cause a significant deflection of coolant upon contacting a tool being held by the rotating chuck, allowing a relatively greater portion of the tool to be cooled; and/or
simplified manufacture due to less components (e.g., devoid of a detachable nozzle ring of the type disclosed in U.S. Pat. No. 5,358,360); it will be understood that while formation of intermediary and slanted groove portions opening out to the front chuck end requires some complexity of manufacture (which may require machining the component with a more rare machining center with 4 degrees of freedom rather than the standard three) this manufacturing difficulty is believed to possibly be less than that associated with manufacture and assembly of an extra component such as a nozzle ring.

Such groove arrangement is believed to be particularly beneficial for milling applications, especially those carried out with solid end mills. It is believed to be especially beneficial for machining workpiece materials such as Inconel which heat the machining tool to an extremely high temperature.

It will be understood that the above-said is a summary, and that any of the aspects above may further comprise any of the features described hereinbelow. Specifically, the following features, either alone or in combination, may be applicable to any of the above aspects:

A. One or more slanted groove portions can each be inclined at an inclination angle $\alpha$ relative to the forward direction, the inclination angle $\alpha$ being within the range: $2° \leq \alpha \leq 20°$. Preferably, the inclination angle $\alpha$ is within the range: $4° \leq \alpha \leq 12°$.

B. In a rotating chuck having a plurality of slanted groove portions, the inclination angle $\alpha$ of each of the slanted groove portions can be the same. Even though the rotating chuck will not be configured to cool selected different portions of a tool, or adjustable for different size tools, it is believed that simplicity of manufacture provided by a single angle can compensate for such disadvantages.

C. A groove arrangement can comprise more slanted groove portions than longitudinal groove portions. It will be understood that manufacturing relatively smaller groove portions, and which are located near an end of a chuck, without each having an associated longitudinal groove portion is simpler.

D. One or more intermediary grooves can comprise one or more longitudinal groove portions extending parallel with a central bore axis.

E. Perpendicular to a bore axis, each longitudinal groove portion can have a constant cross sectional area. Such design can maintain uniform pressure for a portion of the fluid flow path. A longitudinal groove portion together with a slanted groove can define a flow path with a "bent" shape.

F. One or more intermediary grooves can further comprise an annular exit groove at a front bore end in fluid communication with slanted groove portions. The annular exit groove can also be in fluid communication with one or more longitudinal groove portions.

G. An annular exit groove can extend radially outward into a bore surface, further than slanted groove portion(s) and/or longitudinal groove portion(s).

H. A groove arrangement can further comprise an annular inlet groove at a rear bore end.

I. Perpendicular to a bore axis, each slanted groove portion can have decreasing cross sectional area with increasing proximity to the front chuck end.

J. At a front chuck end, at least one, or each, slanted groove portion can have a central cross sectional area with a maximum radial dimension. At least one, or each, slanted groove portion can have a cross sectional area with a radial dimension smaller than the maximum radial dimension. For example, at least one, or each, slanted groove portion can comprise an extremity cross sectional area which decreases in cross sectional area with increasing distance from the central cross sectional area. The extremity cross sectional area can be adjacent to the central cross sectional area. There can be two extremity cross sectional areas located on opposing sides of a central cross sectional area.

K. In an end view of the front chuck end, at least one, or each, slanted groove portion can have a crescent shape.

L. In an end view of a front chuck end, a maximum radial dimension $D_{MR}$ of one or each of the slanted groove portions can be within a range fulfilling the condition: $0.1 \text{ mm} \leq D_{MR} \leq 0.9 \text{ mm}$. Preferably, the maximum radial dimension $D_{MR}$ of one or each of the slanted groove portions is within a range fulfilling the condition: $0.1 \text{ mm} \leq D_{MR} \leq 0.5 \text{ mm}$.

M. At a front chuck end, each slanted groove portion can have a radius of curvature defining an imaginary circle. Each slanted groove portion can have an outlet area defined between the slanted groove portion and an imaginary continuation arc of the shank abutment sub-surfaces. The outlet area can be less than 20% of a circle area of the imaginary circle.

Without being bound to theory, it is believed that a small decreasing cross sectional area, such as that defined above and/or being part of extremities of a crescent shape, of a slanted groove portion can provide a potentially beneficial particulate mist on a tool being cooled. Similarly, without being bound to theory, it is believed that providing a cross sectional area having a sufficient radial dimension, such as that defined above and/or being a central part of a crescent shape, of a slanted groove portion can provide a beneficial coolant stream on a tool being cooled. Consequently, some of the slanted groove portions shapes defined above have been found to provide a dual mist and coolant stream on a tool, which is believed to be beneficial.

BRIEF DESCRIPTION OF THE DRAWINGS

For a better understanding of the subject matter of the present application, and to show how the same may be carried out in practice, reference will now be made to the accompanying drawings, in which:

FIG. 1 is a perspective view of a chuck in accordance with the subject matter of the present application;

FIG. 2A is an end view of a front chuck end of the chuck in FIG. 1;

FIG. 2B is a cross-section view taken along line IIB-IIB in FIG. 2A;

DETAILED DESCRIPTION

Figure 3C:
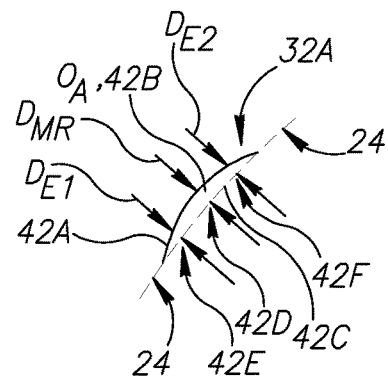
FIG. 3C is an enlarged schematic view of a slanted groove portion in FIG. 3A, together with portions of adjacent shank abutment sub-surfaces 24.

Reference is made to FIGS. 1 to 2B, which illustrate a rotating chuck 10 configured for rotation about a rotation axis $A_R$.

The rotating chuck 10 can comprise opposing front and rear chuck ends 12, 14.

The rotating chuck 10 can also comprise a shank-receiving bore 16 opening out to, and extending rearwardly from, the front chuck end 12.

The shank-receiving bore 16 can be defined by a circumferentially extending bore surface 18.

The shank-receiving bore 16 can have a bore axis $A_B$, which can be coaxial with the rotation axis $A_R$.

The bore axis $A_B$ extends through the center of the shank-receiving bore 16 and defines forward and rearward directions $D_F$, $D_R$.

The shank-receiving bore 16 can also comprise a front bore end 20 proximate to the front chuck end 12 and a rear bore end 22 rearward of the front bore end 20.

Figure 3A:
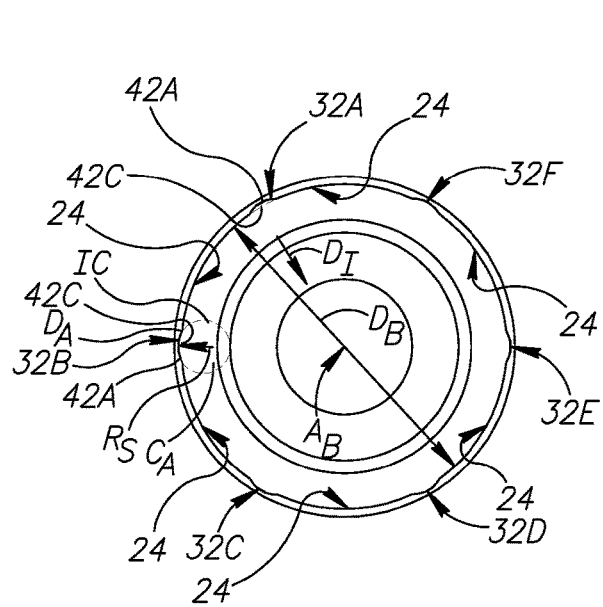
FIG. 3A is an enlarged view of an encircled portion designated IIIA in FIG. 2A.

The bore surface 18 can comprise one or more shank abutment sub-surfaces 24 defining a bore diameter $D_B$ (FIG. 3A).

The bore surface 18 can also comprise a groove arrangement 26 recessed in the shank-receiving bore 16 further than the one or more shank abutment sub-surfaces 24.

The groove arrangement 26 defines a flow path 28 (FIG. 4) in fluid communication with the front and rear bore ends 20, 22.

The groove arrangement 26 can comprise an annular inlet groove 30 at the rear bore end 22.

The groove arrangement 26 comprises one or more slanted groove portions 32 opening out to, and being inwardly inclined towards, the front chuck end 12. In the present example, shown best in FIG. 3A, there are six equally circumferentially spaced slanted groove portions 32 (32A, 32B, 32C, 32D, 32E, 32F).

The inclination can be at an inclination angle α (FIG. 3B) relative to the forward direction. In this example the inclination angle α of each of the slanted portions is 10°.

The groove arrangement 26 also comprises intermediary grooves 36.

The intermediary grooves 36 can comprise one or more longitudinal groove portions 38 extending parallel with the central bore axis $A_B$, and an annular exit groove 40.

Figure 3B:
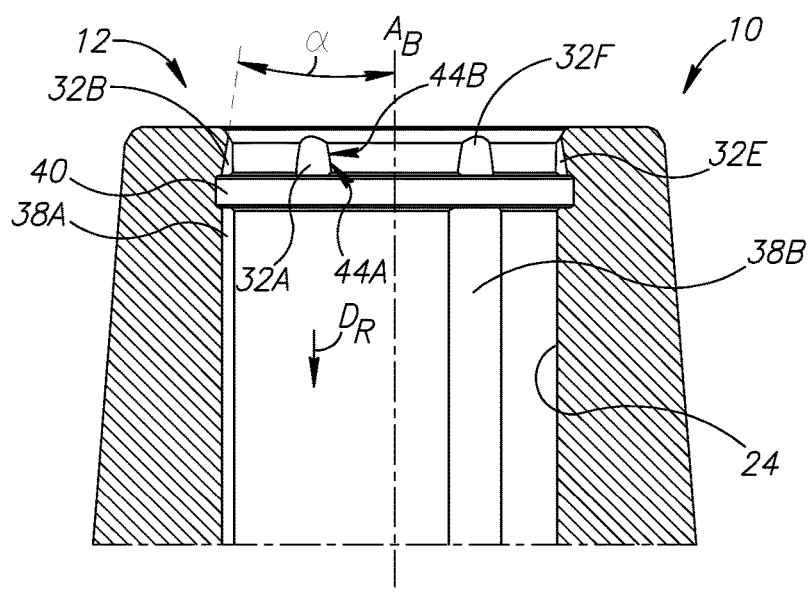
FIG. 3B is an enlarged view of a portion designated IIIB in FIG. 2B.

As seen in the cross-section of FIG. 3B, the annular exit groove 40 may extend radially outward of the slanted groove portions 32 and the longitudinal groove portions 38.

In the present example, there are three equally circumferentially spaced longitudinal groove portions 38 (38A, 38B, 38C).

Each longitudinal groove portion can have a constant cross sectional area. To elaborate, in this example each of the longitudinal groove portions 38 (38A, 38B, 38C) have an identical construction including the feature of constant cross sectional area. Accordingly, in the view shown in FIG. 2B it will be understood that there is a side and front view of first and second longitudinal groove portions 38A, 38B which would be the same if any single longitudinal groove portion was viewed from two perspectives. As shown, each cross section of the longitudinal groove portions 38A, 38B is constant from the annular inlet groove 34 to the annular exit groove 40.

As each slanted groove portion 32 in the present example has an identical construction only the first and second slanted groove portions 32A, 32B will be described in detail, with the same reference characters for each sub-element being shared by the identical slanted groove portions.

Referring to FIGS. 3A to 3C, it is shown that the first slanted groove portion 32A is in fluid connection with the annular exit groove 40 but that there is no longitudinal groove portion extending in the rearward direction $D_R$ therefrom.

Also shown is that at the front chuck end 12, the first slanted groove portion 32A has an arc-shaped edge 42A which opens out in an inward direction $D_I$, i.e. into the bore. It will be understood that even though not shown, the longitudinal groove portions 38 can also have an arc-shaped edge which opens out in the inward direction $D_I$. Preferably, but optionally, perpendicular to the bore axis $A_B$ (e.g. FIG. 3), it will be understood that the arc-shaped edges of the slanted groove portions can be narrower than the arc-shaped edge of the longitudinal groove portions 38. In any case, both can be arc-shaped edges which can be simply and efficiently manufactured by milling (e.g. by moving a solid end mill, oriented slanted to the bore axis $A_B$, along a path parallel to the bore axis $A_B$).

Generally speaking, for the purposes of the specification and claims, references to cross sectional area of portions of a groove arrangement, such as the slanted groove portions, are to be delimited by a shank of a tool, having a diameter corresponding to the bore diameter. Even without a tool shank shown in FIG. 3A, it will be understood that such delimitation can also be constituted by an imaginary continuation arc of the shank abutment sub-surfaces 24.

For example, a crescent shaped cross sectional area 42B (also called an outlet area $O_A$) of the first slanted groove portion 32A, in the end view shown in FIGS. 3A and 3C is delimited by the arc-shaped edge 42A and an imaginary continuation arc 42C which, similar to the shank abutment sub-surfaces 24, extends at the bore diameter $D_B$. The imaginary continuation arc 42C represents a boundary of the first slanted groove portion 32A as well as the cross sectional area 42B thereof at the front chuck end 12, when a tool shank (FIG. 4) is inserted in the shank-receiving bore 16.

At a central area 42D of the cross sectional area 42B the first slanted groove portion 32A has a maximum (i.e. largest) radial dimension $D_{MR}$. The extremity cross sectional areas 42E, 42F can be located on either side, and in this example both sides, of the center 42D. Each extremity cross sectional area decreasing in cross sectional area with increasing distance from the center 42D. For example first and second extremity radial dimensions $D_{E1}$, $D_{E2}$ are smaller than the maximum radial dimension $D_{MR}$.

Referring to FIG. 3A, the second slanted groove portion 32B can have a radius of curvature $R_S$ defining an imaginary circle $I_C$. An outlet area $O_A$ can be defined between the slanted groove portion 32B, or more precisely for the example shape shown, the arc-shaped edge 42A thereof, and the imaginary continuation arc 42C. The outlet area in this example is about 6% of a circle area $C_A$.

Referring now to FIG. 3B, it is noticed that the slanted groove portions 32 have decreasing cross sectional area with increasing proximity to the front chuck end 12. For example at point 44A the groove portion 32A is wider than at point 44B.

Referring again to FIG. 3B, one or more of the slanted grove portions (e.g., slanted groove portion 32A) may be non-collinear with all of the longitudinal groove portions, in the axial direction.

Figure 4:
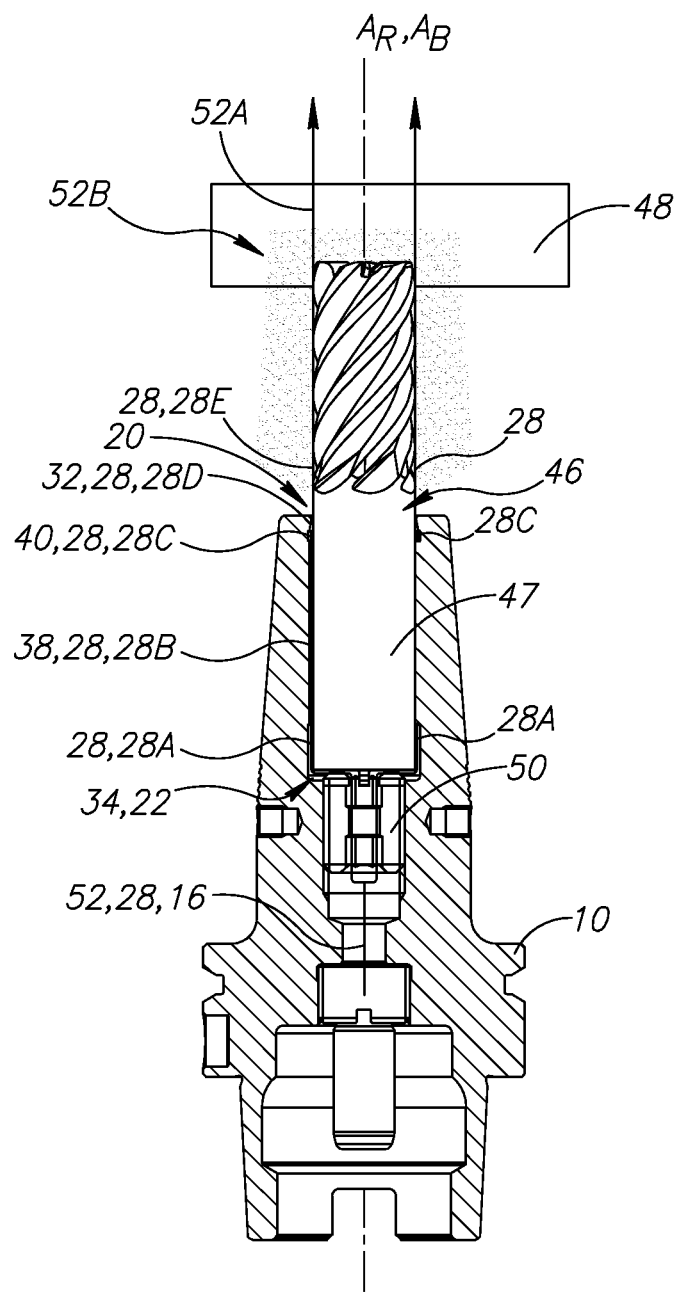
FIG. 4 is a cross-section view of the chuck shown in FIG. 2B, further including a preset screw, and a tool, the assembly schematically machining a workpiece with coolant flow.

Referring also to FIG. 4, a tool 46, for example a solid end mill is shown schematically machining a workpiece 48, for example made of Inconel.

The tool 46 has a shank 47 with a shank diameter corresponding to bore diameter $D_B$.

The tool 46 abuts a preset screw 50 which determines an axial position thereof.

During operation, coolant 52 follows the following flow path 28: from a portion of the rotating chuck 10 which is rearward of the shank-receiving bore 16 a first portion of the flow path 28A extends into the shank-receiving bore 16 and more particularly the annular inlet groove 34; from the annular inlet groove 34 a second portion of the flow path 28B continues into the longitudinal groove portions 38; from the longitudinal groove portions 38 a third portion of the flow path 28C continues into the annular exit groove 40; and from the annular exit groove 40 a fourth portion of the flow path 28D continues into the slanted groove portions 32.

From the slanted groove portions 32, the coolant 52 is projected on the tool 46 in the form of one or more streams 52A which continue along the length of the tool 46, and a particulate mist 52B is also formed and schematically shown as dots.

The description above includes an exemplary embodiment and details, and does not exclude non-exemplified embodiments and details from the claim scope of the present application.

What is claimed is:

1. A rotating chuck comprising:
   a front chuck end; and
   a shank-receiving bore opening out to, and extending rearwardly from, the front chuck end;
   the shank-receiving bore defined by a circumferentially extending bore surface and:
   having a bore axis extending through the center of the shank-receiving bore and defining forward and rearward directions; and
   comprising a front bore end proximate to the front chuck end of the chuck and a rear bore end rearward of the front bore end;
   the bore surface comprising:
   one or more shank abutment sub-surfaces defining a bore diameter; and
   a groove arrangement recessed in the shank-receiving bore further than the one or more shank abutment sub-surfaces from the central bore axis;
   the groove arrangement defining a flow path in fluid communication with the front and rear bore ends and comprising:
   an annular inlet groove at the rear bore end;

one or more slanted groove portions opening out to, and being inwardly inclined towards, the front chuck end; and one or more intermediary grooves connecting the annular inlet groove and the one or more slanted groove portions, the one or more intermediary grooves including one or more longitudinal groove portions extending parallel with the central bore axis; wherein:

the one or more intermediary grooves further comprises an annular exit groove at the front bore end in fluid communication with the slanted groove portions;

the annular exit groove extends radially outward of the slanted groove portions and the longitudinal groove portions; and the shank-receiving bore, including the entire aforementioned groove arrangement, is formed on a portion of the rotating chuck having one-piece unitary construction.

2. The rotating chuck according to claim 1, wherein the groove arrangement comprises more slanted groove portions than longitudinal groove portions.

3. The rotating chuck according to claim 1, wherein, perpendicular to the bore axis, each longitudinal groove portion has constant cross sectional area.

4. The rotating chuck according to claim 1, wherein: the annular exit groove is also in fluid communication with the one or more longitudinal groove portions.

5. The rotating chuck according to claim 4, wherein the groove arrangement comprises more slanted groove portions than longitudinal groove portions.

6. A rotating chuck comprising:
a front chuck end; and
a shank-receiving bore opening out to, and extending rearwardly from, the front chuck end;
the shank-receiving bore defined by a circumferentially extending bore surface and:
having a bore axis extending through the center of the shank-receiving bore and defining forward and rearward directions; and
comprising a front bore end proximate to the front chuck end of the chuck and a rear bore end rearward of the front bore end;
the bore surface comprising:
one or more shank abutment sub-surfaces defining a bore diameter; and
a groove arrangement recessed in the shank-receiving bore further than the one or more shank abutment sub-surfaces from the central bore axis;
the groove arrangement defining a flow path in fluid communication with the front and rear bore ends and comprising:
an annular inlet groove at the rear bore end;
one or more slanted groove portions opening out to, and being inwardly inclined towards, the front chuck end; and
one or more intermediary grooves connecting the annular inlet groove and the one or more slanted groove portions; wherein
the shank-receiving bore, including the groove arrangement, is formed on a portion of the rotating chuck having one-piece unitary construction; and
at the front chuck end, at least one of the slanted groove portions has a central cross sectional area with a maximum radial dimension and at least one extremity cross sectional area adjacent to the central cross sectional area which decreases in cross sectional area with increasing distance from the central cross sectional area.

7. The rotating chuck according to claim 6, wherein the one or more intermediary grooves further comprises an annular exit groove at the front bore end in fluid communication with the slanted groove portions.

8. A rotating chuck comprising:
a front chuck end; and
a shank-receiving bore opening out to, and extending rearwardly from, the front chuck end;
the shank-receiving bore defined by a circumferentially extending bore surface and:
having a bore axis extending through the center of the shank-receiving bore and defining forward and rearward directions; and
comprising a front bore end proximate to the front chuck end of the chuck and a rear bore end rearward of the front bore end;
the bore surface comprising:
one or more shank abutment sub-surfaces defining a bore diameter; and
a groove arrangement recessed in the shank-receiving bore further than the one or more shank abutment sub-surfaces from the central bore axis;
the groove arrangement defining a flow path in fluid communication with the front and rear bore ends and comprising:
an annular inlet groove at the rear bore end;
one or more slanted groove portions opening out to, and being inwardly inclined towards, the front chuck end; and
one or more intermediary grooves connecting the annular inlet groove and the one or more slanted groove portions;
wherein
the one or more intermediary grooves includes an annular exit groove at the front bore end in fluid communication with the slanted groove portions, the annular exit groove extending radially outward of the slanted groove portions, and
the shank-receiving bore, including the entire aforementioned groove arrangement, is formed on a portion of the rotating chuck having one-piece unitary construction.

9. The rotating chuck according to claim 8, wherein the one or more slanted groove portions are each inclined at an inclination angle $\alpha$ relative to the forward direction, the inclination angle $\alpha$ being within the range: $2°\leq\alpha\leq20°$.

10. The rotating chuck according to claim 9, wherein the inclination angle $\alpha$ is within the range: $4°\leq\alpha\leq12°$.

11. The rotating chuck according to claim 8, wherein the one or more slanted groove portions is a plurality of slanted groove portions; and the inclination angle $\alpha$ of each of the slanted groove portions is the same.

12. The rotating chuck according to claim 8, wherein, perpendicular to the bore axis, each slanted groove portion has decreasing cross sectional area with increasing proximity to the front chuck end.

13. The rotating chuck according to claim 8, wherein, in an end view of the front chuck end, at least one slanted groove portion has a crescent shape.

14. The rotating chuck according to claim 8, wherein:
at the front chuck end, at least one of the slanted groove portions has a central cross sectional area with a maximum radial dimension and at least one extremity cross sectional area adjacent to the central cross sectional area which decreases in cross sectional area with increasing distance from the central cross sectional area.

15. The chuck according to claim 8, wherein, in an end view of the front chuck end, a maximum radial dimension $D_{MR}$ of at least one of the slanted groove portions is within a range fulfilling the condition: $0.1 \text{ mm} \leq D_{MR} \leq 0.9 \text{ mm}$.

16. The chuck according to claim 15, wherein the maximum radial dimension $D_{MR}$ of the at least one slanted groove portion is within a range fulfilling the condition: $0.1 \text{ mm} \leq D_{MR} \leq 0.5 \text{ mm}$.

17. The chuck according to claim 8, wherein, in an end view of the front chuck end, a maximum radial dimension $D_{MR}$ of each slanted groove portion of the one or more slanted groove portions is within a range fulfilling the condition: $0.1 \text{ mm} \leq D_{MR} \leq 0.9 \text{ mm}$.

18. The chuck according to claim 17, wherein the maximum radial dimension $D_{MR}$ of each slanted groove portion of the one or more slanted groove portions is within a range fulfilling the condition: $0.1 \text{ mm} \leq D_{MR} \leq 0.5 \text{ mm}$.

19. The rotating chuck according to claim 8, wherein:
at the front chuck end, each slanted groove portion has a radius of curvature defining an imaginary circle and an outlet area defined between the slanted groove portion and an imaginary continuation arc of the shank abutment sub-surfaces; and
the outlet area is less than 20% of a circle area of the imaginary circle.

20. The rotating chuck according to claim 19, wherein the outlet area is less than 10% of the circle area.

* * * * *